Nov. 23, 1965  B. H. WILKINSON  3,219,569
ELECTROLYTIC METAL REMOVAL APPARATUS
Filed June 2, 1961  2 Sheets-Sheet 2
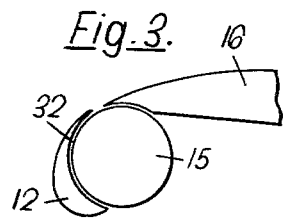
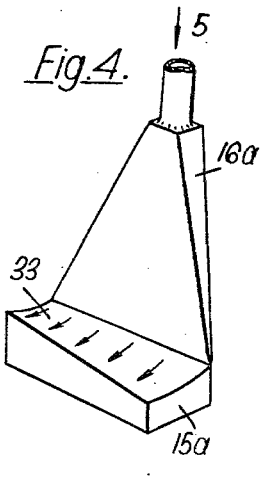
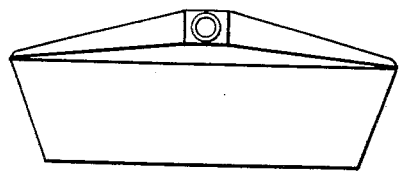
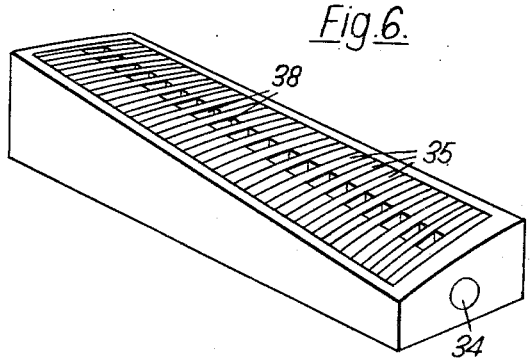
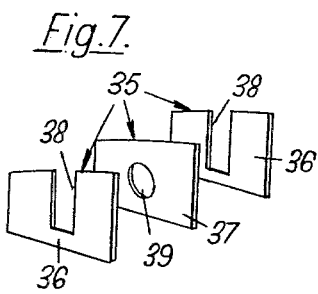
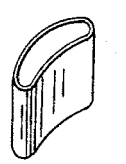
Inventor
Bernard Hall Wilkinson
By Cushman, Darby & Cushman
Attorneys

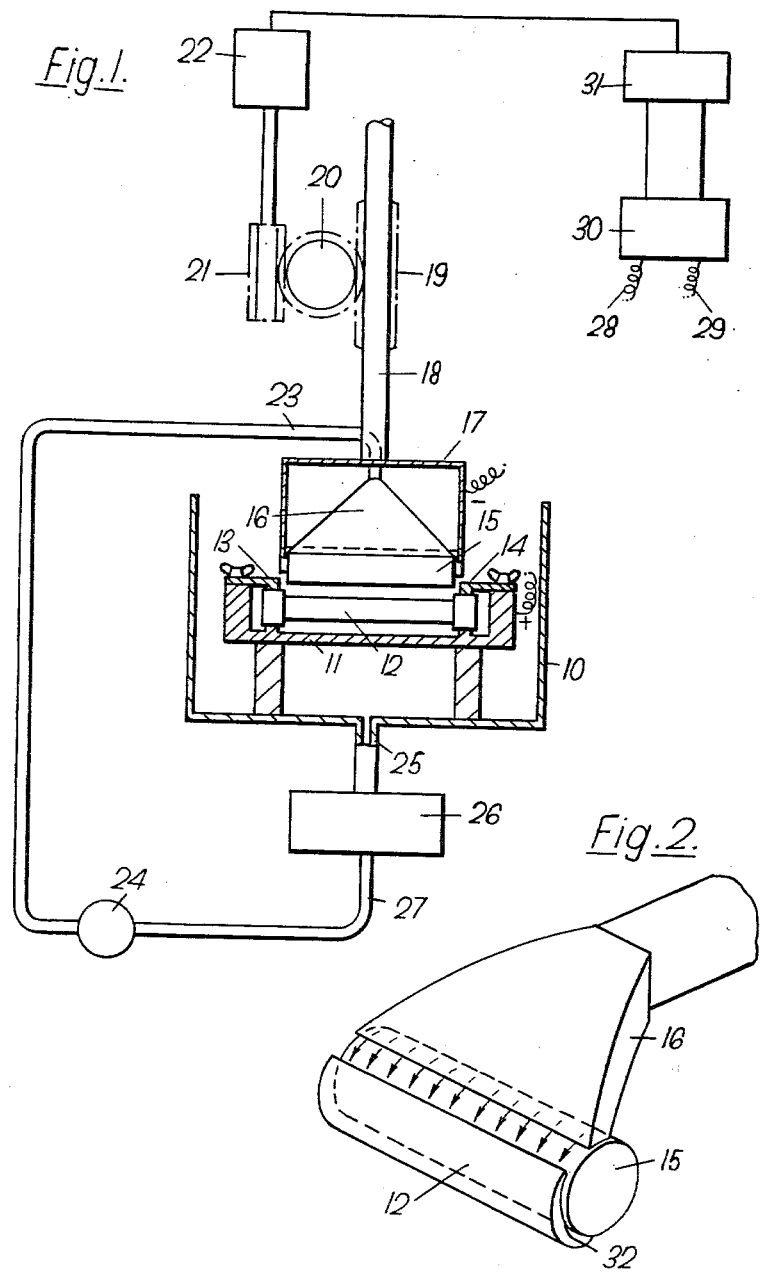

United States Patent Office 3,219,569
Patented Nov. 23, 1965

3,219,569
ELECTROLYTIC METAL REMOVAL APPARATUS
Bernard Hall Wilkinson, Glasgow, Lanark, Scotland, assignor to Rolls-Royce Limited, Derby, England, a company of Great Britain
Filed June 2, 1961, Ser. No. 114,357
Claims priority, application Great Britain, June 3, 1960, 19,828/60, 19,829/60
5 Claims. (Cl. 204—224)

This invention concerns a method and apparatus for removing metal electrolytically from a workpiece.

According to one aspect of the present invention there is provided a method of removing metal electrolytically from a workpiece which comprises maintaining an electrode in substantially as close proximity to the workpiece as is possible consistent with avoiding the occurrence of a spark between the electrode and the workpiece, pumping a high rate of flow of electrolyte between the workpiece and the electrode and applying low voltage direct current to workpiece and the electrode.

The term "low voltage" as used in this specification is to be understood to indicate a voltage not exceeding 48 volts, the preferred voltage being of the order of 12 volts.

The term "high rate of flow" as used in this specification means a mass flow of electrolyte fast enough to prevent the formation of local concentrations of the products of electrolysis at the face of the anode workpiece. For example where the workpiece is a turbine blade of 5 in. length, flows in the order of 20 gallons per minute have been used.

Preferably the gap between the electrode and the workpiece is automatically maintained substantially constant during metal removal.

Preferably the gap is maintained within the range of 0.005 to 0.040 inch.

The current density on the workpiece is preferably as high as possible to obtain the highest rate of removal of metal consistent with achieving satisfactory surface finish on the workpiece. For example, where the workpiece is a blade and metal is being removed from a surface of the blade having an area of 10 sq. in., and where the gap between the workpiece and the electrode is 0.035 in., a current density of 40 amperes per sq. in., has been used.

The preferred electrolyte is common salt, but other electrolytes may be used depending on the nature of the workpiece and the electrode.

The material used for the electrode depends upon the nature of the material being worked and also upon the constitution of the electrolyte, the material being such that it will not be corroded by the electrolyte.

According to another aspect of the present invention there is provided apparatus for removing metal eletctrolytically from a workpiece comprising an electrode, means for maintaining said electrode in substantially as close proximity to the workpiece as is possible consistent with avoiding the occurrence of a spark between the electrode and the workpiece, means for pumping a high flow of electrolyte to the gap between said electrode and said workpiece, and means for applying a low voltage direct current between the electrode and the workpiece.

Preferably the electrolyte is fed through a chute which is shaped to give the electrolyte the desired direction of flow when it leaves a slot at the end of the chute under high pressure. The chute may be attached to or formed integrally with the electrode and so shaped that the electrolyte follows the natural curvature of the electrode itself when it leaves the chute.

Preferably the apparatus incorporates a high pressure pump for supplying the electrolyte and a filter for removing electrolytic deposits from the electrolyte so that the electrolyte can be recirculated through the pump and used continuously.

The electrode may be hollow and electrolyte may be supplied to the electrode internally thereof so that it flows out on the surface of the workpiece from apertures formed in the surface of the electrode. The apertures may be in the form of a row of slots.

The invention is illustrated, merely by way of example, in the accompanying drawings in which:

FIGURE 1 shows diagrammatically apparatus according to the present invention,

FIGURE 2 is a perspective view of an electrode, electrolyte supply chute and workpiece, forming part of the apparatus shown in FIGURE 1, these members being shown in their operative position.

FIGURE 3 is a side elevation of the apparatus shown in FIGURE 2,

FIGURE 4 is a perspective view of an alternative form of electrode and electrolyte supply chute for use with the apparatus of FIGURE 1, FIGURE 5 is a view in the direction of the arrow 5 of FIGURE 4, FIGURE 6 is a perspective view of a further form of electrode, FIGURE 7 is a perspective exploded view of part of the electrode shown in FIGURE 6, and FIGURE 8 is a perspective view of another form of electrode.

Referring to the drawings, the apparatus comprises a tank 10 in which is supported a fixture 11 for carrying the workpiece 12 which is clamped in position by means of clamps 13 and 14. The workpiece, in this instance, is a rough forged turbine blade of "Nimonic" alloy and it is desired to form an accurate aerofoil profile on the blade.

The working electrode 15 is attached to an electrolyte chute 16 supported in a boxlike enclosure 17 carried on a rod 18 by which the electrode assembly can be moved vertically. The rod 18 slides in a guide 19 and is driven up and down by gearing 20, 21, the latter being driven by an electric motor 22.

The electrolyte is supplied to the electrolyte chute 16 by a flexible pipe 23 fed by a high pressure pump 24. After use, the electrolyte flows back through the tank 10 and a drain 25 into a filter 26 from which it flows via a pipe 27 to the inlet of the pump 24.

The electrolyte is preferably an aqueous solution of sodium chloride and is supplied at a high rate of flow. Thus if the electrode has a length of 5 inches, the rate of flow may be 20 gallons per minute.

The workpiece 12 is made the anode and the electrode 15 is made the cathode.

12 volts direct current is supplied via leads 28 and 29 from a power unit 30, the workpiece 12 being connected to lead 29, and the electrode 15 being connected to the lead 28.

The power unit 30 also contains a direct current amplifier which feeds a signal representative of the current in the gap between the electrode 15 and workpiece 12 to a servo control unit 31 which controls movements of the motor 22 to maintain the gap between the electrode 15 and workpiece 12 constant.

The apparatus then continues to form the blade profile automatically, the gap being maintained constant by the servo motor in dependance upon the value of the current in the gap 32.

To form a convex surface on the workpiece 12, an electrode of the shape shown in FIGURE 4 is employed. The electrode 15a having a concave working surface 33 is fed by an electrolyte chute 16a in a similar manner to the arrangement described with reference to FIGURE 2.

An alternative form of electrode, embodying the electrolyte supply chute is shown in FIGURE 6. This electrode is hollow and is fed with an electrolyte via an inlet aperture 34. The convex working surface of the electrode (for forming concave surfaces on the workpiece, consists of the edges 35 of a number of plates 36, 37 (FIGURE 7) contained within an outer metal frame which is connected to the cathode of the power unit 30 by means not shown.

The plates 37 are made of metal and are sandwiched between the plates 36 which are made of plastic. Suitable gaps 38 and holes 39 are provided in the plates 36, 37 for flow of electrolyte on to the surface of the workpiece from within the electrode.

The edges 35 of the metal plates 37 constitute the effective working surface of the electrode, and so to prevent the formation of ridges on the blade surface corresponding to the plastic plates 36, relative vibration should be imposed between the electrode and the workpiece, the amplitude of vibration being at least equal to the thickness of the plates 36.

The electrolyte is preferably common salt but any electrolyte can be used which will not attack the electrode chemically.

The electrode material can be any material not corrodable by the electrolyte, although it must be an electrically conducting material, and is preferably a stainless steel.

The electrolyte chute should be joined to the electrode by welding or brazing material which is not attacked by the electrolytic action or by the electrolyte alone. The chute itself must be of a material similar to the electrode or of a material which will not interact with the electrode material on the workpiece during electrolysis.

The electrodes 15 and 15a described above can be formed initially by a similar electrolytic action by using a blade of the desired shape as an electrode and using billets from which the electrodes are to be formed as workpieces. The blade is used to cut into the billet a shape corresponding to the profile aerofoil portion of the blade.

The electrode shown in FIGURE 8 can be used to remove unwanted protuberances of metal, for example, cracked lugs on flame tubes for gas turbine engines. As previously electrolyte is pumped between the electrode and the protuberance, the concave or convex surface of the electrode being disposed adjacent the protuberance depending on whether the protuberance is disposed on the external convex surface or the internal concave surface of the flame tube.

The invention has particular application to metals which are difficult to machine by conventional methods. For example alloys sold under the registered trademark "Nimonic" and containing a high percentage of cobalt such as Nimonic 115, can be quickly machined by using this invention.

By appropriate selection of factors such as the size of the gap between the electrode and the workpiece, the voltage used, and the rate of flow, a high grade surface finish e.g. of 20 micro-inches or better, may be produced.

I claim:

1. An electrolytic machining apparatus, including a shaping electrode comprising a solid metal body having an external forming surface which is complementary in shape to a predetermined shape it is desired to produce on a workpiece, and a hollow electrolyte chute providing a passage therethrough for a flow of electrolyte, said chute being finally attached at its downstream end to the body and movable as a unit therewith with the downstream end of said chute inclined towards the body, and providing an electrolyte discharge slit immediately adjacent said body, which slit borders and faces across said forming surface so that electrolyte flowing through the chute discharges from said slit in a stream across said forming surface, the stream at least initially flowing tangentially in contact with said forming surface, and means for supporting a workpiece in juxtaposition to said forming surface.

2. An electrolytic machining apparatus, including a shaping electrode comprising a solid cylindrical metal body whose external cylindrical convex surface provides a forming surface which is complementary in shape to a cylindrical concave surface it is desired to produce on a workpiece, and a hollow electrolyte chute providing a passage therethrough for a flow of electrolyte, said chute having an elongate downstream end which is fixedly attached to the body so as to extend lengthwise of the cylindrical convex surface thereof and movable as a unit therewith, said downstream end of said chute having a longitudinal centre line which intersects said cylindrical convex surface at a small angle, the chute providing an electrolyte discharge slit immediately adjacent said body, which slit borders and faces across said forming surface so that electrolyte flowing through the chute discharges from said slit in a stream across said forming surface, the stream at least initially flowing tangentially in contact with said forming surface, and means for supporting said workpiece in juxtaposition to said forming surface.

3. A shaping electrode as in claim 2 in which the downstream end of said chute has a rim portion which is spaced radially from said cylindrical convex surface, said rim portion and said cylindrical convex surface defining therebetween said electrolyte discharge slit.

4. An electrolytic machining apparatus, including a shaping electrode comprising a solid elongate metal body having an external forming surface which is curved concavely transversely to the longitudinal extent of the body, which forming surface has a longitudinal edge and is complementary in shape to a convex surface it is desired to produce on a workpiece, and a hollow electrolyte chute providing a passage therethrough for a flow of electrolyte, said chute having an elongate downstream end which is fixedly attached to the body along said longitudinal edge and movable as a unit therewith, said chute having a longitudinal centre line which is disposed at approximately a right angle to said forming surface, the chute providing an electrolyte discharge slit immediately adjacent said body, which slit borders and faces across said forming surface so that electrolyte flowing through the chute discharges from said slit in a tangential stream transversely across said forming surface, and means for supporting a workpiece in juxtaposition to said forming surface.

5. In an electrolytic machining apparatus comprising an electrode having an external forming surface for shaping a workpiece and means for supporting the workpiece in juxtaposition to said forming surface, the improvement where said electrode has a solid metal body and said forming surface is complementary in shape to a predetermined shape it is desired to produce on said workpiece, and a hollow electrolyte chute providing a passage therethrough for a flow of electrolyte, said chute being fixedly attached at its downstream end to the said body and movable as a unit therewith, and providing an electrolyte discharge slit immediately adjacent said body, which slit borders and faces across said forming surface so that electrolyte flowing through the chute discharges from said slit in a stream across said forming surface, the stream at least initially flowing tangentially in contact with said forming surface.

References Cited by the Examiner

UNITED STATES PATENTS

| | | | |
|---|---|---|---|
| 2,844,531 | 7/1958 | Prince | 204—143 |
| 2,909,641 | 10/1959 | Kucyn | 219—69 |
| 2,927,191 | 3/1960 | Matulaitis | 219—69 |
| 3,002,907 | 10/1961 | Williams | 204—224 |
| 3,019,178 | 1/1962 | Williams | 204—224 |
| 3,041,265 | 6/1962 | Williams | 204—224 |
| 3,058,895 | 10/1962 | Williams | 204—143 |
| 3,095,364 | 6/1963 | Faust et al. | 204—143 |
| 3,120,482 | 2/1964 | Williams | 204—224 |

FOREIGN PATENTS 335,003   9/1930   Great Britain.

JOHN H. MACK, *Primary Examiner.*